United States Patent [19]

Inoue

[11] Patent Number: 5,648,651

[45] Date of Patent: Jul. 15, 1997

[54] CARD FEEDING DEVICE FOR FEEDING CARDS OF VARYING THICKNESS

[75] Inventor: Makoto Inoue, Tachikawa, Japan

[73] Assignees: Kabushiki Kaisha TRD, Tokyo; Kabushiki Kaisha Hatsuri Kimura, Gifu, both of Japan

[21] Appl. No.: 515,922

[22] Filed: Aug. 16, 1995

[30] Foreign Application Priority Data

Dec. 19, 1994 [JP] Japan ..................... 6-333830

[51] Int. Cl.⁶ .............. G06K 13/00; G06K 13/06; G06K 13/04
[52] U.S. Cl. .................. 235/475; 235/479; 235/483
[58] Field of Search .................. 235/475, 480, 235/479, 477, 483; 198/369.71, 369.2, 369.1; 360/99.02, 99.12

[56] References Cited

U.S. PATENT DOCUMENTS

| | | | |
|---|---|---|---|
| 3,629,556 | 12/1971 | Orzechowski | 235/61.11 |
| 3,959,623 | 5/1976 | Nakahara | 235/61.11 |
| 4,724,310 | 2/1988 | Shimamura | 235/483 |
| 4,795,891 | 1/1989 | Morigaki | 235/380 |
| 4,833,310 | 5/1989 | Shimamura | 235/479 |
| 5,017,764 | 5/1991 | Hashimoto | 235/454 |
| 5,142,523 | 8/1992 | Kamoshita | 369/75.2 |
| 5,146,069 | 9/1992 | Orinoto | 235/475 |
| 5,264,686 | 11/1993 | Kitahara | 235/475 |

FOREIGN PATENT DOCUMENTS

| | | | |
|---|---|---|---|
| 0201720 | 9/1987 | Japan | 198/624 |
| 5-46816 | 2/1993 | Japan . | |

*Primary Examiner*—Donald T. Hajec
*Assistant Examiner*—Douglas X. Rodriguez
*Attorney, Agent, or Firm*—Frishauf, Holtz, Goodman, Langer & Chick

[57] ABSTRACT

A card feeding device for feeding a rectangular card along a card feeding direction that intersects a line across the width of the card at a right angle. The card feeding device includes a guide mechanism for leading guide portions provided at side edges of the card along the card feeding direction, a drive roller for elastically contacting a first side edge of the card, and a facing roller positioned opposite to the drive roller for freely and rotatably contacting a second side edge of the card opposite the first side edge of the card contacted by the drive roller. An axis of rotation of the drive roller is displaced, in a direction opposite to the card feeding direction, from an axis of rotation of the facing roller, such that the drive roller and the facing roller hold the card and feed the card directly in the card feeding direction.

13 Claims, 8 Drawing Sheets

# CARD FEEDING DEVICE FOR FEEDING CARDS OF VARYING THICKNESS

BACKGROUND OF THE INVENTION

1) Field of the Invention

The present invention relates to a card loading device with a card feeding mechanism that automatically feeds a rectangular card along a line of travel that intersects a line across the width of the card at a right angle, and loads it into and discharges it from a receptacle. In particular, the present invention relates to a card loading device with a card feeding mechanism that feeds and discharges a rectangular card having a connector at its front face, and that engages the connector of the card with the connector of the receptacle, which is located forward along the line of travel of the card, in order to electrically connect the card to a card information processing mechanism, which is connected to the receptacle.

2) Description of Related Art

In general, a conventional card loading device is designed so that it automatically feeds and discharges cards that have an almost regular thickness. More specifically, drive rollers that are so arranged that they correspond to the respective plain sides of a card, and a pair of card accepting rollers are provided that form pinch rollers, so that a card, which has been inserted between rollers, is held in the direction of its thickness and conveyed by the rollers.

A conventional card loading device restricts the type of card that can be applied to one that has an almost regular thickness. To load cards having different thicknesses into the receptacle, various card loading devices corresponding to the thicknesses of the individual card must be prepared.

SUMMARY OF THE INVENTION

It is an object of the present invention to provide a light and compact card loading device that can handle cards having different thicknesses, and that can both feed and load the cards into a receptacle and discharge the cards therefrom automatically.

To achieve the above object, a card loading device according to the present invention includes a card feeding mechanism that feeds a rectangular card to be loaded along a line of travel that intersects a line across the width of the card at a right angle and that loads the card into a receptacle, the card feeding mechanism comprising:

a guide mechanism for leading guide portions at side edges of the card along a card feeding direction;

a drive roller provided to come into contact elastically with one of the side edges of the card, which is guided by the guide mechanism; and a facing roller that is positioned opposite to the drive roller in the horizontal direction so that the drive roller and the facing roller hold the card and feed it.

The guide mechanism includes a pair of guide channel members in which are formed guide channels, which are positioned opposite to each other along a horizontal line that intersects at a right angle a card feeding direction so that the card is guided in the card feeding direction by guide portions on both side edges of the card that have been inserted into the guide channels, and wherein the drive roller is held biased at its operating position so that a part of an external wall thereof projects horizontally inward in one of the guide channels.

It is preferable that the drive roller be located at a position where its axis of rotation is slightly displaced, in a direction opposite to the card feeding direction, from a horizontal straight line that runs from an axis of rotation of the facing roller.

A card loading device according to the present invention further comprises a card pushing means for card loading which comes into contact with the rear end of the card, which has been fed by the card feeding mechanism, and advances the card forward along the card feeding direction so that a connector formed in a front face of the card is connected to a connector of the receptacle, which is located forward along the card feeding direction.

A card loading device according to the present invention further comprises a card releasing means for card removal that comes into contact with the front face of the card loaded in the receptacle and shifts the card backward so as to unload the card from the receptacle.

According to the card loading device of the present invention, a rectangular card is guided with guide mechanism at guide portions on its side edges by a card feeding mechanism and is fed while being sandwiched in the direction of its width by the drive roller and the facing roller. Even if except for the guide portions the thickness of a card varies at its side edges, such a card can be securely handled, and can be fed to and loaded into the receptacle and can thereafter be discharged.

When the card pushing means for card loading is provided, a card that has been fed by the card feeding mechanism is shifted forward along the card feeding direction, and the connector in the front face of the card can be engaged with the connector of the receptacle.

In addition, when the card releasing means for card unloading is provided, a loaded card can be removed from the receptacle and discharged automatically.

DETAILED DESCRIPTION OF THE PREFERRED EMBODIMENT

One embodiment of a card loading device of the present invention will now be described while referring to FIGS. 1 through 9.

Figure 1:
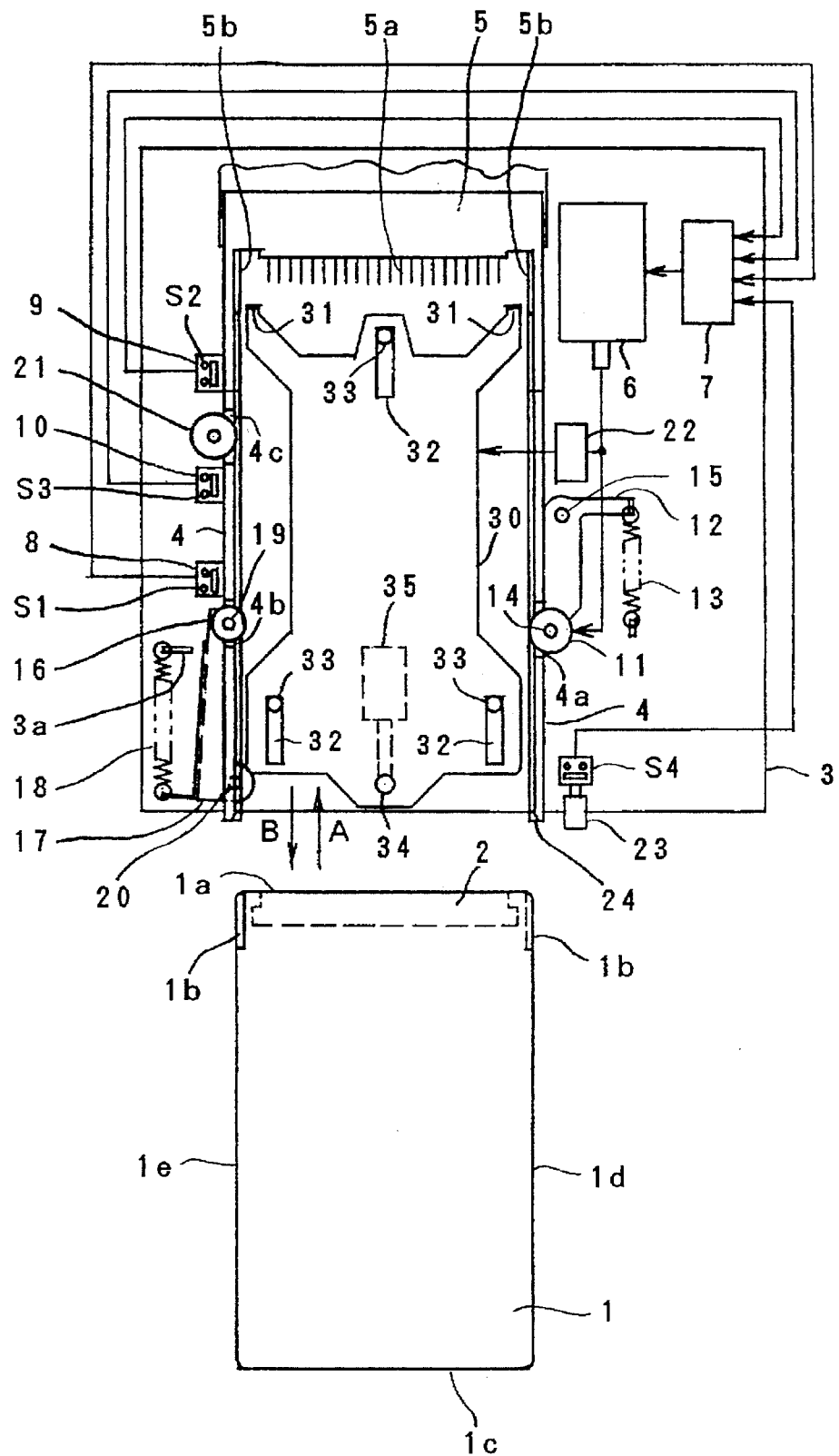
FIG. 1 is an explanatory plan view of the schematic arrangement of a card loading device, shown together with a card, according to one embodiment of the present invention.
Figure 2:
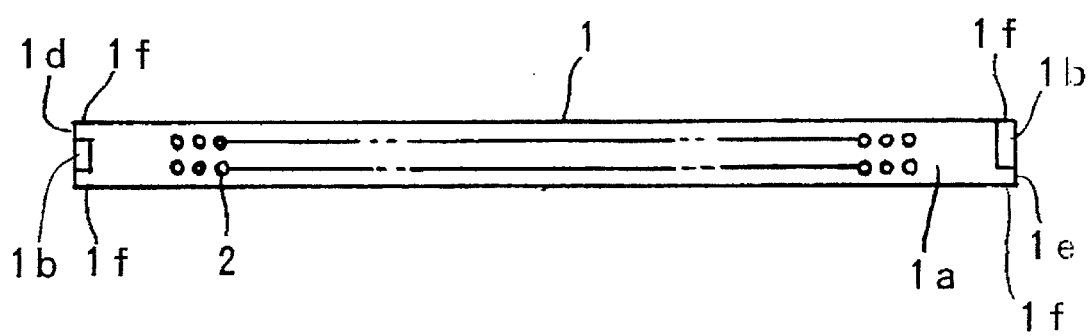
FIG. 2 is a front view of a card that is applicable for the present invention and that is as thick in its entirety as the guide portions at its side edges.
Figure 3:
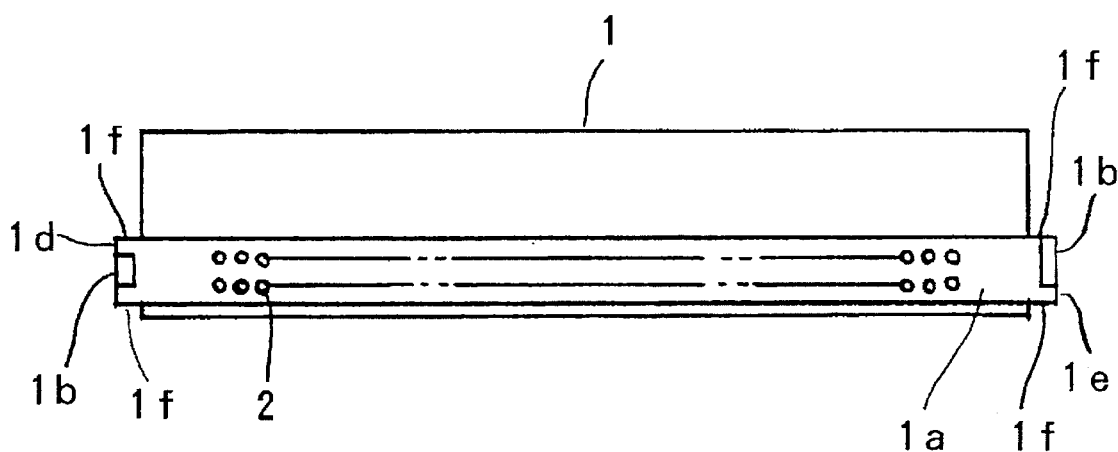
FIG. 3 is a front view of a card that is applicable for the present invention and that is thicker across at its center portion than at its guide portions.
Figure 4:
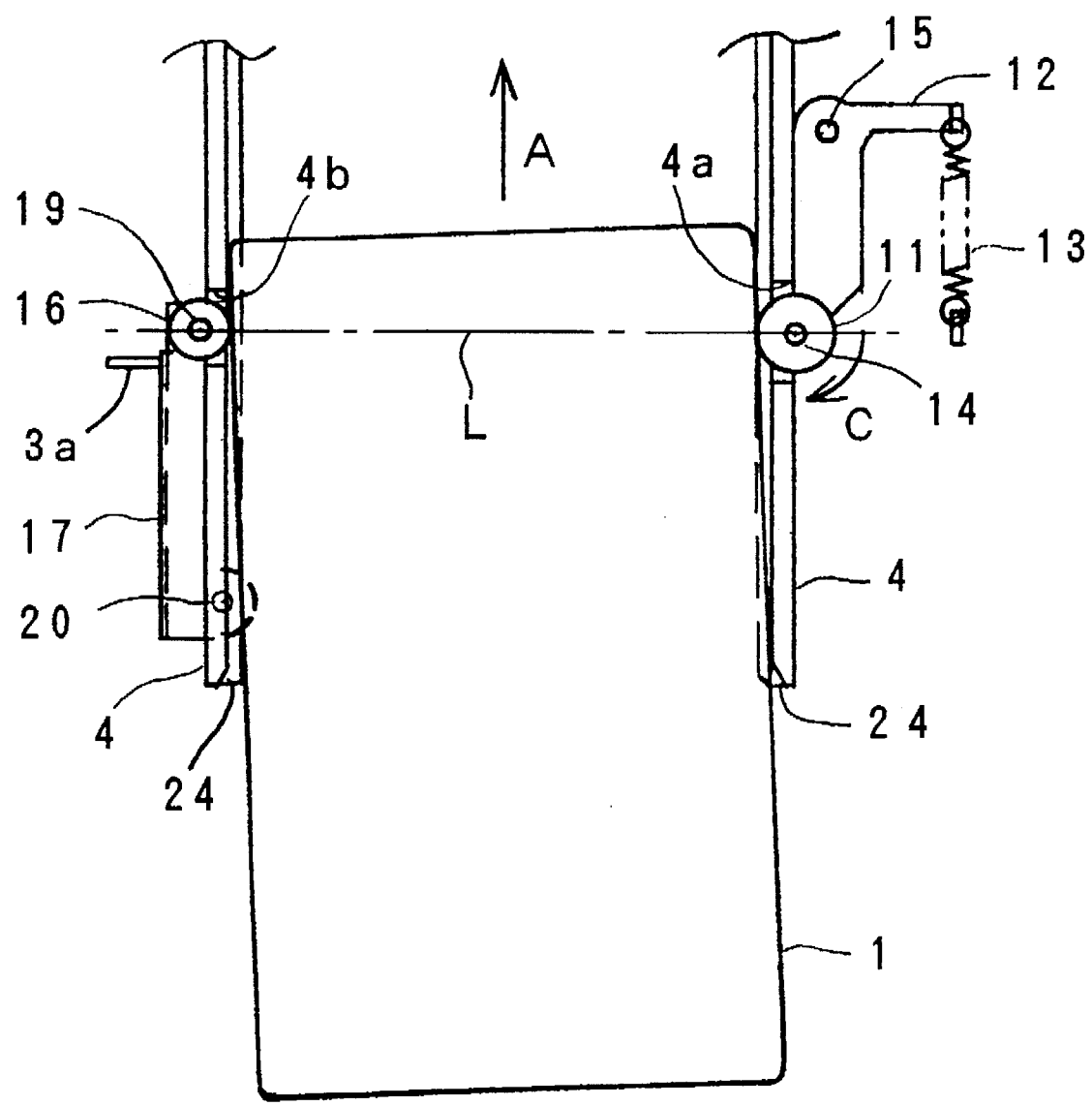
FIG. 4 is a plan view for depicting the direction in which a card advances when the axis of rotation of a drive roller and the axis of rotation of a facing roller are positioned along a straight line extending horizontally.
Figure 5:
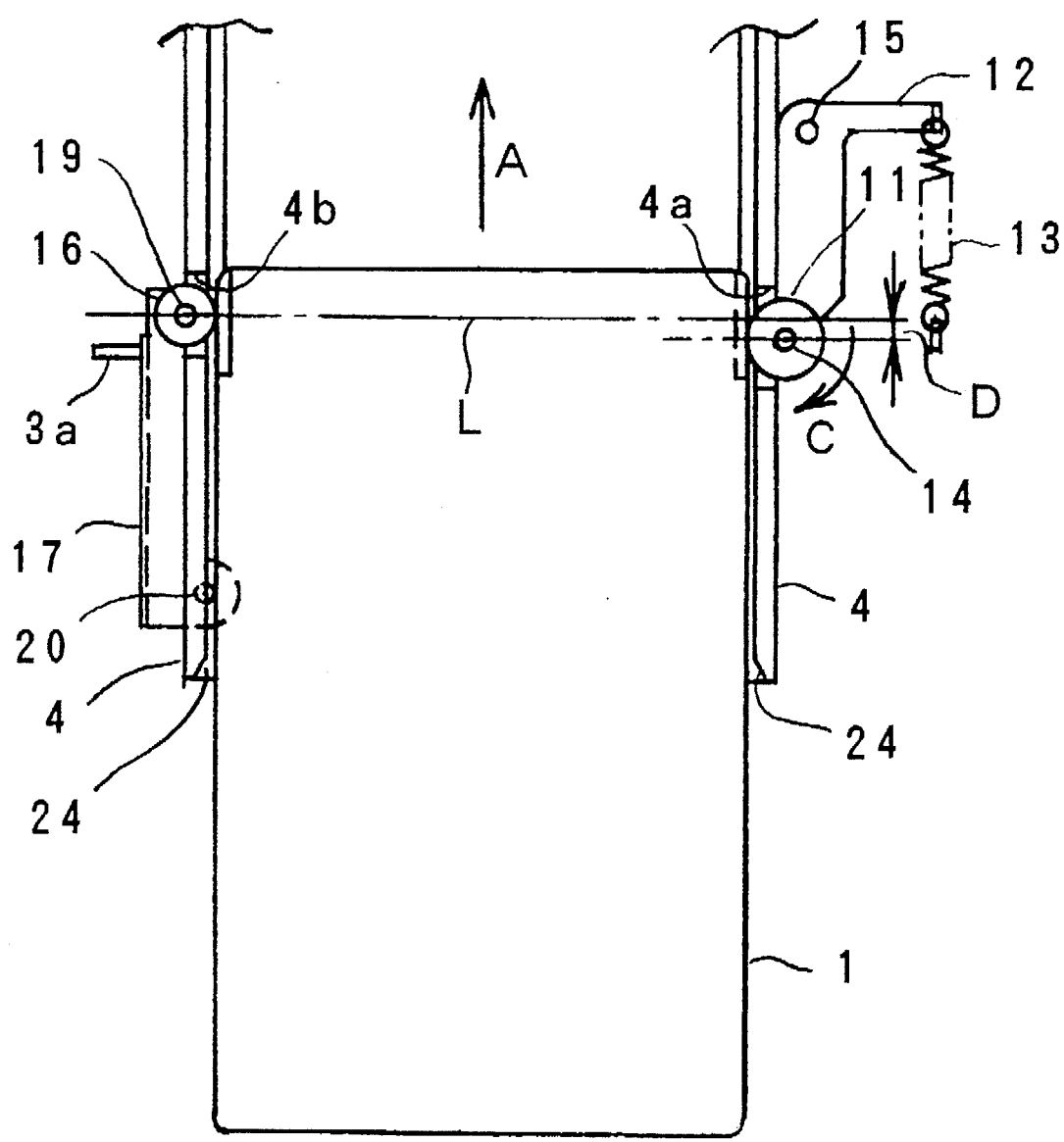
FIG. 5 is a plan view for depicting a preferable positional relationship between the axis of rotation of the driver roller and the axis of rotation of the facing roller according to the present invention.

FIG. 1 is an explanatory plan view of the schematic arrangement of a card loading device, which is shown together with a card example, according to one embodiment of the present invention. FIGS. 2 and 3 are diagrams showing the front faces of two different types of cards, which, except for guide portions at their side edges, have different thicknesses. FIG. 2 is a front view of a card that is as thick in its entirety as its guide portions, and FIG. 3 is a front view of a card having a center portion that is thicker than its guide portions. FIGS. 4 and 5 are plan views for explaining the positional relationship between the axis of rotation of a drive roller and the axis of rotation of a facing drive roller. In FIGS. 4 and 5, the attitudes of the cards as they are advanced are different since the positioning of the axis of rotation of the drive rollers in the card feeding direction differ from the positioning of the axis of rotation of the facing rollers.

A card 1 has a card connector 2 in its front face 1a. The card connector 2, a connector pin receiving portion, is formed of an array of holes having a small diameter where connector pins 5a of a receptacle, which will be described later, are inserted when the card connector 2 engages a base connector 5 of the receptacle. A base of the card loading device 3 has a card information processing function, and includes the receptacle that is constituted by the base connector 5.

Card guide channels 4 are formed by a pair of guide channel members consisting of channel bars, each of which in cross section has a horizontal U shape, and is attached to the base 3. The base connector 5 is positioned forward and faces the front face 1a of the card 1 that is guided along the card guide channels 4. The base connector 5 has connector pins 5a and insertion guides 5b.

The card 1 to be loaded is inserted, through a card insertion port 24, along the card guide channels 4 in a direction that is indicated by an arrow A (hereafter referred to as a "card feeding direction", while a direction that crosses it at a right angle may be referred to as a "horizontal direction"). When the card 1 is advanced farther, the card connector 2 engages the base connector 5, and as a result, the card 1 can be electrically connected to the card information processing mechanism of the base 3. A motor 6 serves as a drive source, and a controller 7 controls the forward and reverse rotation of the motor 6 and halts its rotation.

The card 1, which has a rectangular shape, is an integrated circuit memory card having a printed electric circuit and is called, for example, a "Personal Computer Memory Card" or "PC card." There are various card types that have different thicknesses except for guide portions at their side edges, which are led along the guide channels. That is, for the card 1 in FIG. 2, the thickness of each guide portion 1f is equivalent to the thickness of its center portion, while for the card 1 in FIG. 3, the thickness of the center portion is considerably greater than the thickness of the guide portions 1f.

To automatically feed and discharge such cards, a drive roller 11 flexibly presses against a side 1d, which is one side of the card 1, and a card detection roller 16 is pressed against a side 1e, which is the opposite side of the card 1, and accepts the card 1. While rotating, the drive roller 11 and the detection roller 16 hold the card 1 in the direction of its width and feed it in the card feeding direction that crosses at a right angle the line of the width of the card 1.

The drive roller 11 is provided rotatably around a shaft 14. This shaft 14 is provided so that it can be freely extended and retracted almost horizontally by a drive arm 12 that swings as will be described later. The drive roller 11 is freely extended inward and retracted, through an opening 4a that is formed in the guide channel bar, between the extended position where its inward part of the external wall is projected horizontally inward of the guide channel 4, i.e., in a direction (to the left in the drawing) in which the inward part of the external wall approaches the opposite guide channel 4, and the retracted position to which it is horizontally moved outward, and is so biased that it presses elastically against the side 1d of the card 1. The drive roller 11, which is coupled to the motor 6 by a gear train, is driven by the motor 6. In addition, the drive roller 11 is detached from the side 1d of the card 1 when the card connector 2 of the card 1 is engaged with the base connector 5.

The drive roller 11 is positioned on one end of the drive arm 12 that is provided swingably at a drive arm shaft 15, which is a fulcrum shaft. An extension spring 13 is located between the other end of the drive arm 12 and the base 3. The drive arm 12 is held at operating position in biased condition by the extension spring 13. With this structure, the drive roller 11 is biased so that it exerts a elastic pressing force, which is directed horizontally inward, to the side 1d of the card 1.

The detection roller 16 forms a facing roller that makes a pair with the drive roller 11, and is provided rotatably freely around a shaft 19. The detection roller 16 is located at a position horizontally opposite the position of the drive roller 11, so that, through an opening 4b formed in the guide channel bar, it can be freely extended inward and retracted between the extended position where it is projected horizontally inward (to the right in the drawing) of the guide channel via the opening 4b and the retracted position to which it is horizontally moved outward.

More particularly, the detection roller 16 is located so that the shaft 19 is positioned at one end of a detection arm 17 provided swingably around a detection arm shaft 20, and an extension spring 18 is located between the other end of the detection arm 17 and the base 3. The extension spring 18 brings the detection roller 16 into contact with the side 1e of the card 1, and as a result, the detection roller 16 receives the card 1, at the side 1e, which is driven by the drive roller 11. The tension force of the spring 18 is set so that the contact force that acts on the card through the detection roller 16 is extremely smaller than the pressing force acting on the card 1 through the drive roller 11.

A stopper 3a for the detection roller 16 is a raised piece formed by cutting the base 3, and its position is determined by the detection arm 17.

A guide roller 21 is so located that, in an area between the detection roller 16 and the base connector 5, the roller 21 projects horizontally inward slightly of the guide channel 4 through an opening 4c, which is formed in the guide channel bar. With this structure, when the card 1 is to be fed by the drive force of the drive roller 11, the distal end corner of the card 1 is prevented from being caught by the corner of the guide channel bar of the base connector 5.

A first detector 8 detects the card 1 when it has been inserted and has reached the detection roller 16. Symbol S1 denotes its detection switch.

Notches 1b formed in the side edges of the front face 1a have different cross sectional shapes from each other, and extend longitudinally along the side edges from the front face 1a. When the card 1 is inserted into the connector 5 under normal conditions, the insertion guides 5b are fitted into notches 1b.

A second detector 9 distinguishes a particular one side from the another side of the inserted card 1 by examining the notches 1b, and detects an error in the posture of the card 1, such as the inversion or the reversal of the card 1. Symbol S2 denotes its detection switch.

A third detector 10 detects when the card 1 is moved to the final position where the card connector 2 is engaged by the base connector 5. Symbol S3 denotes its detection switch.

A metal sliding plate 30 is positioned beneath the feeding path of the card 1 to be fed. Guide holes 32 formed in the sliding plate 30 extend in the card feeding direction (indicated by the arrow A) or backward (indicated by an arrow B). Guide pins 33 projecting through the base 3 are inserted slidably into the guide holes 32, respectively. With this structure, the sliding plate 30 can reciprocatingly slide in the card feeding direction A and in the opposite direction B.

Hook portions 31 are formed by bending and raising the right and left extended portions of the front end of the sliding plate 30 in the card feeding direction. The hook portions 31 come into contact with the front face 1a of the card 1 that has engaged the base connector 5. With the hook portions 31, the card 1 is disengaged and moved backward.

Figure 6:
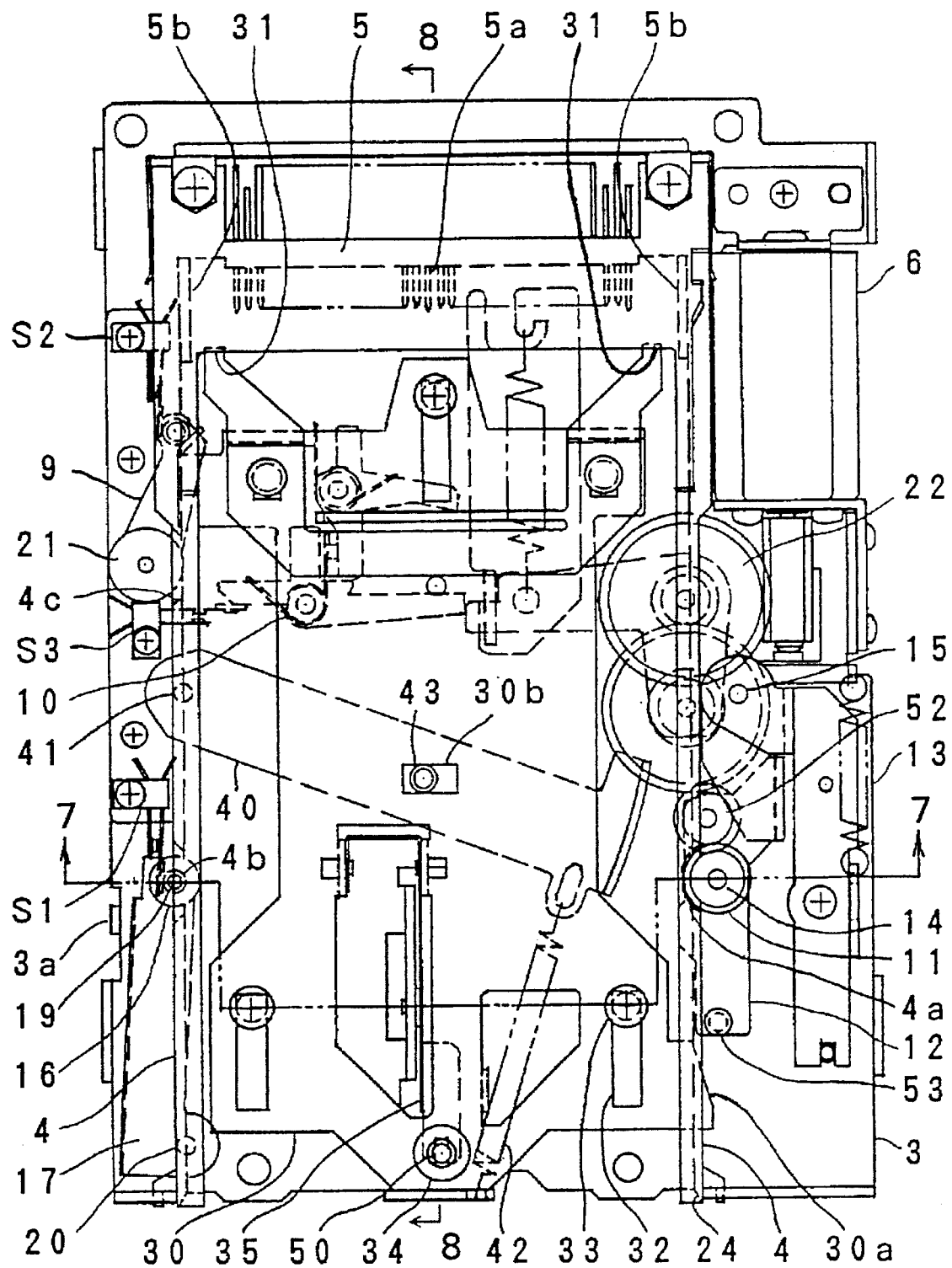
FIG. 6 is a plan view of a specific structure of an operating mechanism for a card loading device according to the embodiment of the present invention.

A card pushing means 34 is integrally formed with the sliding plate 30 at a position that is near the card insertion port 24 of the sliding plate 30. The card pushing means 34 includes a card pushing pin 50 as shown in FIG. 6 that can so ascend and descend as to be projectable above the top face of the sliding plate 30. When the card connector 2 reaches the set position near the base connector 5, the card pushing pin 50 of the card pushing means 34 is projected upward, at the position near the rear end 1c of the card 1, by a card pushing pin control mechanism 35, which is provided below the sliding plate 30.

A drive force transmission section 22 forcibly slides the sliding plate 30 in the card feeding direction and backward. As will be described in detail, the drive force transmission section 22 changes the drive force of the motor 6 to a constant rotation force by means of a spring, the sliding plate 30 is driven with its rotation force, and as a result, the card 1 is forced so that the card connector 2 shifts between the position where it has approached the base connector 5 and the position where it has engaged the base connector 5. The magnitude of the rotation force exerted by the drive force transmission section 22 is considerably greater than the feeding force exerted by the drive roller 11 when driving the card 1, and thereby the connector 2 of the card 1 is engaged with and disengaged from the base connector 5.

An ejection button 23 is provided to issue an instruction to release the loaded card 1 from the receptacle of the base. 3, to feed it backward and to discharge it from the card insertion port 24. Symbol S4 denotes its switch.

The switches S1, S2, and S3 of the respective first through third detectors 8, 9, and 10 and the switch S4 are connected to the controller 7. When the first detector 8 detects the insertion of the card 1, the controller 7 causes the motor 6 to rotate forward and to drive the drive roller 11 to feed the card 1 in the card feeding direction, which is indicated by the arrow A.

When the third detector 10 detects the engagement of the card 1, the controller 7 halts the rotation of the motor 6. Upon the depression of the ejection button 23, the controller 7 causes the motor 6 to rotate in reverse and to forcibly retract the sliding plate 30, so that the card 1 is moved backward and the card connector 2 is disengaged from the base connector 5. Then, the drive roller 11 rotates reversely and the card 1 is fed backward, as is indicated by the arrow B.

Further, when the second detector 9 detects an error in the posture of the card 1 that has been inserted, or more specifically, when the switch S2 is not closed within a set time after the switch S1 has been closed, the controller 7 causes the motor 6 to rotate in reverse to forcibly feed the card 1 backward, as is indicated by the arrow B, and to discharge it.

With this structure, the drive roller 11 presses the card 1 at its side 1d horizontally inward and the detection roller 16, which is positioned horizontally opposite to the drive roller 11, comes into contact elastically with the opposite side 1e of the card 1. The card 1 is therefore held and fed while it is sandwiched by the drive roller 11 and the detection roller 16 in the direction of its width.

In the case where, as is shown in FIG. 4, the drive roller 11 and the detection roller 16 are located along a straight line L extending exactly horizontally (i.e. when the axis of rotation of the drive roller 11 is positioned on the straight line L that runs across the axis of rotation of the detection roller 16 and extends horizontally), the distal corner (the upper left corner in FIG. 4) at the edge of the side face 1e of the card 1 is pressed against the side face of the guide channel bar guiding that corner, and a feeding malfunction of the card 1 may occur. It was found that this phenomenon occurs due to the following. The drive roller 11 applies, to the side face 1d of the card 1, the horizontally inward pressing force and the rotation force in the direction indicated by an arrow C to feed the card 1. Thus, the couple effect that occurs at the contact point of the side 1e of the card 1 with the detection roller 16 acts on the card 1. As a result, the direction in which the card 1 is actually fed is changed to a direction diagonal to the side face 1e, which is slightly displaced from the original card feeding direction indicated by the arrow A.

According to a preferred feature of the present invention, therefore, as shown in FIG. 5, the axis of rotation of the drive roller 11 is located not along the straight line L that runs across the axis of rotation of the detection roller 16 and extends horizontally, but at a position that is displaced rearward of the straight line L, in a direction opposite to the card feeding direction indicated by the arrow A, by the distance D.

With this arrangement, when the couple effect is applied by the pressing force and the rotation force of the drive roller 11, the direction in which the card 1 is actually fed can be matched precisely with the card feeding direction along which the guide channels 4 extend. Consequently, the feeding of the card 1 can be accomplished smoothly and successfully.

In the structure as mentioned above, the distance D from the straight line L of the axis of rotation of the detection roller 16 can be properly determined in consonance with relating conditions such as the position of the drive arm shaft 15, the tension force of the spring 13, the friction coefficient between the drive roller 11 and the card 1, the number of rotations of the drive roller 11 and the like. It is, however, preferable that the distance D be normally 1 mm or smaller, for example, 0.5 mm or smaller being sufficient.

Figure 7:
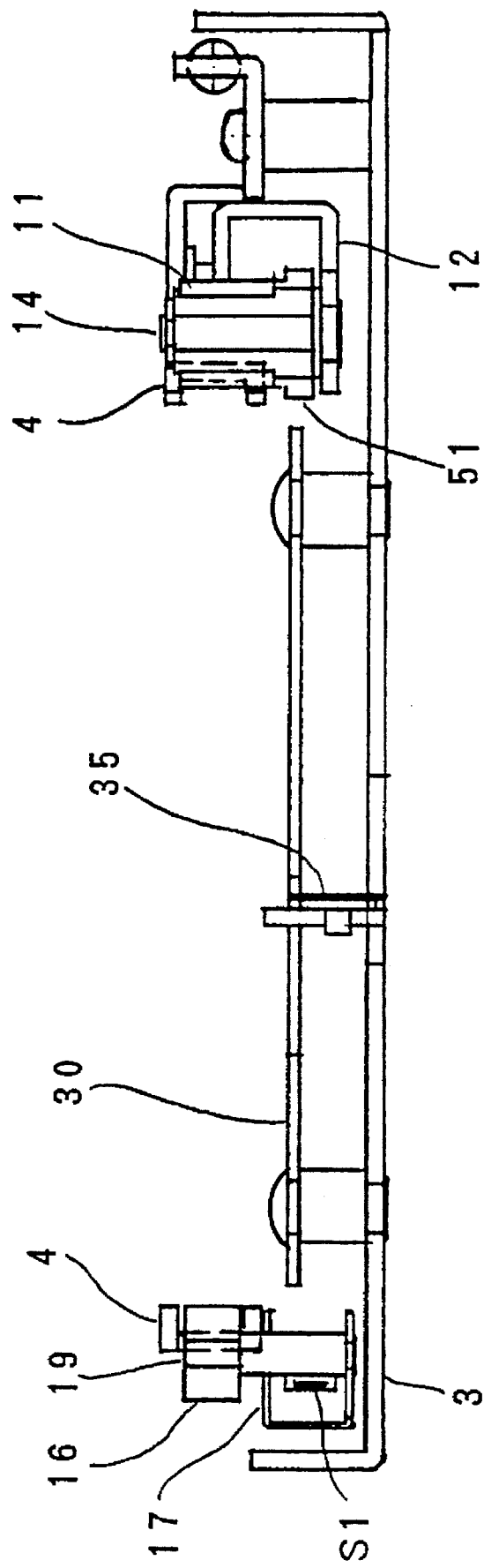
FIG. 7 is a cross-sectional view taken along the line 7—7 in FIG. 6.

FIG. 6 is a plan view of the specific arrangement of the operating mechanism of the card loading device as above, and FIG. 7 is a cross sectional view taken along the line 7—7 in FIG. 6.

As was previously described, the pair of card guide channels 4 are formed by the guide channel bars each of which has horizontal U shaped cross section and which are attached to the base 3. The card guide channels 4 are employed to guide the portions 1f at the side edges of the card 1 when the card 1 is fed in and is discharged. The openings 4a, 4b, and 4c are formed in the guide channel bars in order to bring the drive roller 11, the detection roller 16, and the guide roller 21 into contact with the card 1.

The drive roller 11 rotates together with a rubber cylinder fitted into the hub of a gear 51. The gear 51 is coupled with a gear train that includes a plurality of gears of the drive force transmission section 22, which transmits the rotation force of the drive shaft of the motor 6.

An idle gear 52 is provided for the drive arm 12 that is provided swingably around the drive arm shaft 15. When the card 1 is conveyed in the card feeding direction, the drive roller 11 is pressed against the card 1 in consonance with its relationship with the drive arm shaft 15.

In addition, a roller 53 is located at one of the distal ends of the drive arm 12. When the card connector 2 is so positioned as to engage the base connector 5, the roller 53 abuts upon a roller cam 30a, which is provided at one end of the sliding plate 30. As the cam 30a abuts upon the roller 53 and shifts it outward, the drive arm 12 is actuated to swing counterclockwise against the spring 13, which extends the other end of the arm 12 that biases the drive roller 11 horizontally inward. As a result, the drive roller 11 is detached from the side face 1d of the card 1.

In FIG. 6, the detection roller 16, the detection arm 17, and the shaft 19, which are provided on the left, are components that feed the card 1 while holding it with the drive roller 11. These components also serve as the first detector. When the card 1 is manually inserted through the card insertion port 24 along the guide channels 4, and one distal corner of its front face 1a comes into cotact with the detection roller 16, the detection arm 17 is actuated to detect that the card 1 has been inserted.

More specifically, the movable contact of the switch S1 is located toward the external surface of the shaft 19, so that it comes into contact elastically with the shaft 19 by using a leaf spring of the switch S1. With this arrangement, the detection arm 17 is actuated and displaced. When the card 1 is inserted and the detection roller 16 is accordingly retracted against the rotational and displacing force of the leaf spring of the switch S1, the shaft 19 presses the contact point of the switch S1 to close the switch S1. Thus, it is detected that the card 1 has been inserted.

When the card 1 is not inserted, the shaft 19 comes into contact with an edge of the opening 4b of the guide channel bar and may also serve as a stopper for the detection arm 17. The detection arm 17 is in contact with the stopper 3a and regulates the position of the detection roller 16 for holding and feeding the card 1 with the drive roller 11.

The detection arm shaft 20 is provided on the base 3 to render the detection arm 17 swingable freely.

A sector arm 40 is supported by an arm shaft 41 so as to swing in a plane parallel with the face of the sliding plate 30 and to engage the terminal gear of the gear train of the previously described drive force transmission section 22.

A roller 43 is provided rotatably freely at the center of the sector arm 40 so that it projects upward. The roller 43 is inserted and fitted into a rectangular engagement hole 30b that is formed in the sliding plate 30.

As the sliding plate 30 is conveyed in the card feed direction while the front face 1a of the card 1 is in contact with the hook portions 31, the sliding plate 30 is moved together with the card 1 in the card feeding direction. As a result, the sector arm 40 swings counterclockwise against a recovery spring 42. When the card 1 is further conveyed in the card feeding direction and has reached the predetermined position where the card connector 2 approaches the base connector 5, sector gear teeth, which are formed in the distal edge of the sector arm 40, reach in and engage the terminal gear of the gear train of the drive force transmission section 22.

Figure 8:
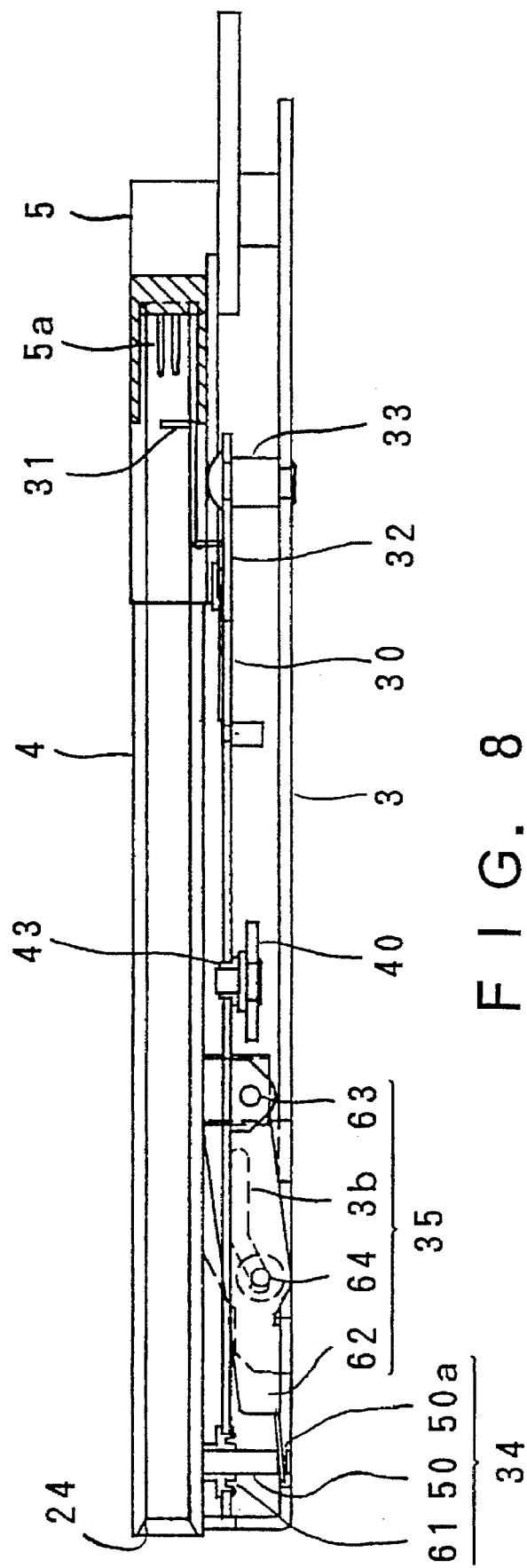
FIG. 8 is a cross-sectional view taken along the line 8—8 in FIG. 6.

FIG. 8 is a detailed drawing showing the card pushing means 34. The card pushing pin 50 is the main member of the card pushing means 34 and is located near the rear face 1c of the card 1 while the card 1 is moved in the card feeding direction to reach the predetermined position where the front face 1a approaches the connector pins 5a of the base connector 5.

The card pushing pin 50 is inserted into a central through hole of a ring bushing 61, which penetrates the sliding plate 30 at the rear edge portion thereof. Through this ring bushing 61, the card pushing pin 50 can be freely projected upward above the surface of the sliding plate 30 and retracted downward. A groove 50a is formed in the external surface at the lower end of the card pushing pin 50.

In the card pushing pin control mechanism 35 under the sliding plate 30, an arm plate 62 is located on a plane perpendicular to the sliding plate 30 so as to extend in the card feeding direction. Since the front bearing portion at an end of the arm 62 is supported swingably by an arm shaft 63, which is a fixed shaft provided on the sliding plate 30 and extends horizontally, the arm 62 can swing freely within the plane perpendicular to the sliding plate 30.

A cam plate is fixed to a part of the base 3 and extends parallel to the arm 62. In this cam plate is formed a cam groove 3b that has an inclined portion, which extends diagonally upward as it goes along in the card feeding direction, and a continuous horizontal portion. A guide pin 64 is provided in the center of the arm 62 to project horizontally outward, and is so fitted in the cam groove 3b that it can slide freely.

The rear distal end of the arm 62, which is shaped like a fork, is inserted loosely into a groove 50a formed at the lower portion of the card pushing pin 50. The distal end of the arm 62 is thus coupled vertically with the card pushing pin 50.

Figure 9:
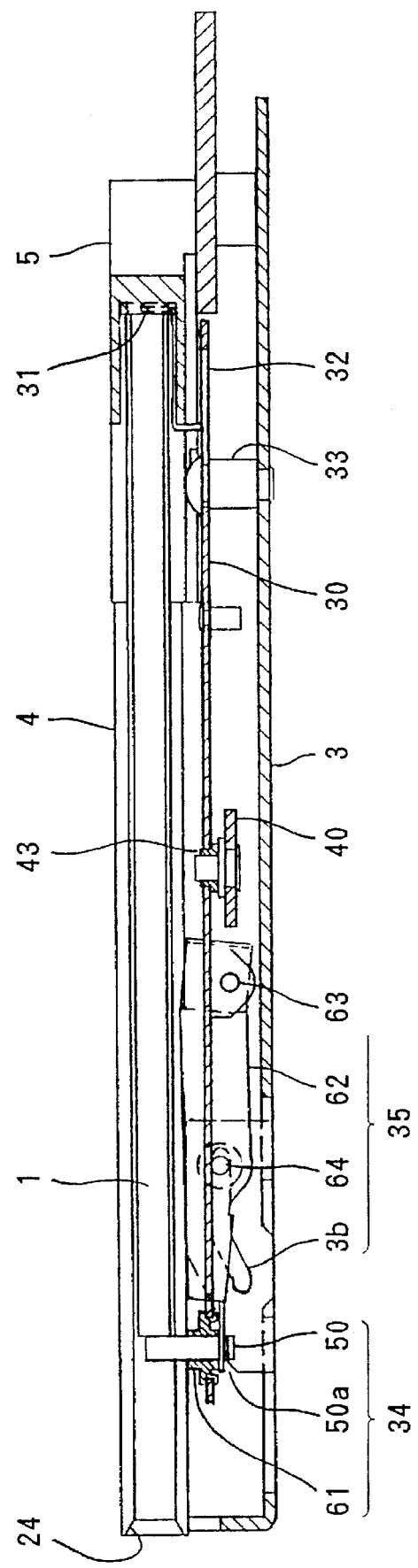
FIG. 9 is a cross-sectional view as similar to FIG. 8 of the state where the card has been loaded.

When the card 1 is held and fed by the drive roller 11 and the detection roller 16, and the front face 1a of the card 1 comes into contact with the hook portions 31 and the sliding plate 30 is moved in the card feeding direction to a position where the front face 1a approaches the connector pins 5a of the base connector 5, the guide pin 64 inserted into the cam groove 3b is guided upward along the inclined portion of the cam groove 3b as the sliding plate 30 is moved in the card feeding direction. The arm 62 swings then around the arm shaft 63 and its distal end is shifted upward, and the card pushing pin 50 is projected upward above the surface of the sliding plate 30. This state is shown in FIG. 9.

In this state, when the sliding plate 30 is conveyed further in the card feeding direction, the terminal gear of the gear train of the drive force transmission section 22 engages the gear teeth at the distal end of the sector arm 40, as is described above. The sliding plate 30 is then moved farther in the card feeding direction via the sector arm 40 by the driving force of the motor 6, while the drive roller 11 is detached from the card side 1d by the cam 30a of the sliding plate 30.

At this time, since the guide pin 64 of the arm 62 slides in the horizontal portion of the cam groove 3b, the card pushing pin 50 of the card pushing means 34 is maintained projecting over the sliding plate 30. Consequently, the card 1 is forcibly and accurately pushed to shift in the card feeding direction by an extremely large force, and the card connector 2 engages the base connector 5.

The above processing in the embodiment will now be explained.

The card 1 to be handled by the card loading device is inserted by hand through the card insertion port 24 along the guide channels 4. The card 1 is then pushed in between the drive roller 11 and the detection roller 16 to be held in a sandwiched state therebetween. When the detection roller 16 is retracted and the switch S1 is closed on, the motor 6 starts driving.

As a result, since the drive roller 11 is rotated via the drive force transmission section 22, the card 1 is conveyed in the card feeding direction while it is held in the direction of its width by the drive roller 11 and the detection roller 16.

As the card 1 is moved in the feeding direction, the front face 1a of the card 1 pushes the hook portions 31 of the sliding plate 30, and the sliding plate 30 is moved together with the card 1 in the feeding direction. As the sliding plate 30 is thus moved together with the card 1, the card pushing pin 50 by the card pushing pin control mechanism 35 projects upward in the vicinity of the rear face 1c of the card 1. At the same time, the sector arm 40 is swinged and its distal edge is coupled with the drive force transmission section 22, while the drive roller 11 is detached from the card 1.

Under this state, the rotation force of the motor 6 is transmitted by the drive force transmission section 22, and the sector arm 40 is then driven to swing. The sliding plate 30 is forcibly moved farther forward in the feeding direction and the card pushing means 34 is moved together. Since the card 1 is forcibly pushed by the card pushing pin control mechanism 35 in the card feeding direction in consonance with the forward movement of the sliding plate 30, the card connector 2 in the front face 1a of the card 1 is coupled with the base connector 5 in the receptacle of the base 3. When the card 1 is loaded into the receptacle of the base 3 in this manner, this state is detected by the third detector 10, the switch S3 is closed on, and thus the rotation of the motor 6 is halted.

When the loading is completed, the electronic integrated memory circuit of the card 1 is electrically connected to a card information processing mechanism in the base 3. Then, the card information processing mechanism can process information stored in the loaded card 1 in consonance with its purpose.

When the card information processing is completed, the ejection button 23 is operated and the switch S4 is closed on. Then, the motor 6 rotates in reverse to swing the sector arm 40 in the direction opposite to that in the above loading process. The sliding plate 30 is forcibly moved to the back, and the hook portions 31 at its front end push the front face 1a of the card 1, so that the connector 2 is disengaged from the base connector 5 of the receptacle.

When the sector arm 40 is driven back and is disengaged from the drive force transmission section 22, the recovery spring 42 acts on the sliding plate 30 so that it returns to its original position. In addition, the card pushing pin 50 of the card pushing means 34 is lowered by moving the guide pin 64 of the arm 62 in reverse along the cam groove 3b in the card pushing pin control mechanism 35. The card 1 is moved to the back along the guide channel 4 by the drive roller 11 that is rotated in reverse by the motor 6, and the card 1 is discharged through the card insertion port 24.

In the above embodiment, the card pushing means 34 is located at the lower position in the center of the card 1 along the width. The present invention is not limited to this structure. The card pushing pin that constitutes the card pushing means or any other card pushing members may come into contact with the rear face or any one of the equivalent portions of the card to push. Therefore, the card pushing means may be located not only beneath the card moving path, but above, to the right or to the left of the path.

In the embodiment of the present invention as described above, a rectangular card, such as a memory card so-called a "PC card" for example is handled, and an explanation has been given for a typical case where the card is guided, automatically loaded into the receptacle, and discharged therefrom. Although memory cards, such as PC cards and other information cards have different thicknesses, except for the guide portions at their side edges, their widths are constant as a rule, in general. Therefore, the card loading device of the present invention can be employed for processing every card having a specific size for the guide portions at its side edges.

The card types that can be handled for the card loading device of the present invention are not limited. As long as the guide portions at the side edges of a card are acceptable for the device, the card can be handled, regardless of its shape. Even for a card whose guide portions are considerably thinner than the size of the guide channels along the line of the thickness, such a card can be accepted if it is not deformed when it is held between the drive roller and the facing roller.

Of course, the types of information stored in the card and the recording means are not especially limited. Various memory cards, magnetic cards, optical cards, and other cards can be regarded as cards to be processed.

The above described embodiment of the present invention provides the following effects:

(1) According to the card loading device of the present invention, the card feeding mechanism does not bring rollers into contact with both plane faces of a card to feed it while holding at their faces, but brings rollers into contact with both side faces of the card to feed it while holding it in the direction of the width. Therefore, as long as the guide portions at the side edges of a card fit, the card can be exactly fed and discharged regardless of the thickness of its center portion.

(2) In the card feeding mechanism, while the guide portions at the side edges of a rectangular card are guided by the guide mechanism, one of the side faces of the card extending along the card feeding direction is pressed elastically horizontally inward by the drive roller. A facing roller, which is positioned horizontally opposite to the drive roller, holds the card with the drive roller along the line of the width to feed, or to retreat and discharge the card. The main components of the card feeding mechanism can be provided on the side area along the card feeding path, and as a result, an extremely thin card loading device can be provided.

(3) Since a single drive roller is sufficient for the card feeding mechanism, a compact and light card loading device with a simple structure can be provided at a low manufacturing cost.

(4) Since the facing roller receives the pressing force of the drive roller via the card, the card is prevented from being pressed strongly against the side face of the guide channel member, which is on the side opposite to the drive roller, and ensures the smooth feeding of the card.

(5) The drive roller is located at a position where its axis of rotation is displaced slightly to the back, in the card feeding direction, from the straight line that runs across the axis of rotation of the facing roller and extends horizontally. The direction in which the card is actually fed can be matched precisely to the card feeding direction. As a result, the card is prevented from slanting in the card feeding direction by the couple effect that affects the card due to the drive roller, the distal corner of the card can be prevented from contacting and being caught by the side face of the guide channel member, and the smooth feeding of the card can be achieved.

(6) According to the card loading device of the present invention that includes a card pushing means for card loading, since the card that has been fed by the card feeding mechanism is forcibly pushed forward in the card feeding direction by the card pushing means, the loading of the card into the receptacle is ensured.

(7) According to the card loading device of the present invention that includes a card releasing means for card disengagement, the loaded card can be released from the receptacle and discharged.

What is claimed is:

1. A card feeding device for feeding a rectangular card along a card feeding direction that intersects a line across the width of the card at a right angle, the card feeding device comprising:

a guide mechanism for leading guide portions provided at side edges of the card along the card feeding direction;

a drive roller for elastically contacting a first side edge of the card; and a facing roller positioned opposite to the drive roller for freely and rotatably contacting a second side edge of the card opposite the first side edge of the card contacted by the drive roller;

wherein an axis of rotation of the drive roller is displaced, in a direction opposite to the card feeding direction, from an axis of rotation of the facing roller, such that the drive roller and the facing roller hold the card and feed the card directly in the card feeding direction.

2. The card feeding device according to claim 1, wherein the guide mechanism includes a pair of guide channel members having guide channels formed therein for receiving the guide portions provided at side edges of the card, said guide channels being positioned opposite each other along a line intersecting the card feeding direction at a right angle so that the card is guided in the card feeding direction.

3. The card feeding device according to claim 2, wherein the drive roller is held biased at an operating position such that at least a portion of an external wall of the drive roller projects inward into one of the guide channels.

4. The card feeding device according to claim 1, wherein the axis of rotation of the drive roller is displaced in the direction opposite to the card feeding direction from the axis of rotation of the facing roller by a distance not greater than 1 mm.

5. The card feeding device according to claim 1, further comprising a guide roller contacting the second side edge of the card at a position forward of the facing roller in the card feeding direction.

6. The card feeding device according to claim 1, further comprising a detection switch coupled to the facing roller, said detection switch detecting insertion of the card into the card feeding device.

7. A card loading device for loading a card into a receptacle, said card loading device comprising:

a card feeding device for feeding a rectangular card along a card feeding direction toward the receptacle, said card feeding direction intersecting a line across the width of the card at a right angle; and a card pushing mechanism for contacting a rear portion of the card fed by the card feeding device, and for advancing the card in the card feeding direction until a connector provided a front portion of the card is connected to a connector provided in the receptacle;

wherein the card feeding device comprises:

a guide mechanism for leading guide portions provided at side edges of the card along the card feeding direction;

a drive roller for elastically contacting a first side edge of the card; and a facing roller positioned opposite to the drive roller for freely and rotatably contacting a second side edge of the card opposite the first side edge of the card contacted by the drive roller;

wherein an axis of rotation of the drive roller is displaced, in a direction opposite to the card feeding direction, from an axis of rotation of the facing roller, such that the drive roller and the facing roller hold the card and feed the card directly in the card feeding direction.

8. The card loading device according to claim 7, wherein the guide mechanism of the card feeding device includes a pair of guide channel members having guide channels formed therein for receiving the guide portions provided at the side edges of the card, said guide channels being positioned opposite each other along a line intersecting the card feeding direction at a right angle so that the card is guided in the card feeding direction.

9. The card feeding device according to claim 8, wherein the drive roller of the card feeding device is held biased at an operating position such that at least a portion of an external wall of the drive roller projects inward into one of the guide channels.

10. The card loading device according to claim 7, wherein the axis of rotation of the drive roller of the card feeding device is displaced in the direction opposite to the card feeding direction from the axis of rotation of the facing roller by a distance not greater than 1 mm.

11. The card loading device according to claim 7, wherein the card feeding device further comprises a guide roller contacting the second side edge of the card at a position forward of the facing roller in the card feeding direction.

12. The card loading device according to claim 7, wherein the card feeding device further comprises a detection switch coupled to the facing roller, said detection switch detecting insertion of the card into the card feeding device.

13. The card loading device according to claim 7, further comprising a card releasing mechanism for removing the card from the receptacle, said card releasing mechanism contacting the front portion of the card loaded in the receptacle and shifting the card backward in a direction opposite to the card feeding direction so as to unload the card from the receptacle.

* * * * *